United States Patent [19]

Nelson et al.

[11] Patent Number: 5,673,342
[45] Date of Patent: Sep. 30, 1997

[54] COMMUNICATION SYSTEM COMPRISING A LOW COST OPTICAL FILTER

[75] Inventors: Katherine Theresa Nelson, Gillette; William Alfred Reed, Summit; Kenneth Lee Walker, New Providence, all of N.J.; Ian Arthur White, Dunwoody, Ga.

[73] Assignee: Lucent Technologies Inc., Murray Hill, N.J.

[21] Appl. No.: 654,499

[22] Filed: May 28, 1996

[51] Int. Cl.⁶ .................. G02B 6/26; G02B 6/42
[52] U.S. Cl. .................................... 385/24
[58] Field of Search ................. 385/37, 14, 15, 385/24, 45, 31, 46, 47, 33; 359/3, 9, 15, 19, 569, 115, 124, 127, 130

[56] References Cited

U.S. PATENT DOCUMENTS

| | | | |
|---|---|---|---|
| 4,592,619 | 6/1986 | Weidel | 385/14 |
| 4,621,929 | 11/1986 | Phillips | 356/44 |
| 4,946,250 | 8/1990 | Gonthier | 385/12 |
| 5,475,780 | 12/1995 | Mizrahi | 385/14 |
| 5,570,440 | 10/1996 | Mizrahi | 385/37 |
| 5,606,332 | 2/1997 | Darden et al. | 343/790 |
| 5,606,434 | 2/1997 | Feldman et al. | 359/3 |

OTHER PUBLICATIONS

"Fabrication and Characterization of Low–Loss Optical Fibers Containing Rare–Earth Ions", by S.B. Poole, *Journal of Lightwave Technology*, vol. LT–4, No. 7, Jul. 1986.

Proceedings of IOOC–95, paper WA 2–5, author —J. Nishimura et al., p. 26. This reference is unavailable. We will continue to try to obtain it. If it comes to us, we will submit it to the Patent Office.

*Primary Examiner*—Akm E. Ullah
*Attorney, Agent, or Firm*—Eugen E. Pacher

[57] ABSTRACT

An optical fiber communication system according to the invention comprises an optical fiber filter that can be manufactured at low cost and that can be conveniently incorporated into the system, substantially like a conventional fiber jumper. The filter comprises a length L of axially uniform optical fiber selected to have substantially no loss (e.g., <1 dB) at a wavelength $\lambda_1$, and to have relatively high loss (e.g., >20 dB) at a wavelength $\lambda_2$. The length L will typically be less than 100 m. In one embodiment the optical fiber is a single mode optical fiber at $\lambda_1$ (e.g., 1.3 μm) that does not have a guided mode at $\lambda_2$ (e.g., 1.55 μm). In another embodiment the fiber contains a dopant that does substantially not absorb radiation of wavelength $\lambda_1$, but substantially absorbs at $\lambda_2$. In the second embodiment, $\lambda_1$ can be greater than $\lambda_2$. Fiber filters according to the invention can be advantageously used in a variety of communication systems, and exemplary systems are disclosed.

11 Claims, 2 Drawing Sheets

5,673,342

COMMUNICATION SYSTEM COMPRISING A LOW COST OPTICAL FILTER

FIELD OF THE INVENTION

This invention pertains to the field of optical fiber communication systems.

BACKGROUND OF THE INVENTION

In optical fiber communication systems there frequently arises the need for a component that can strongly suppress radiation in one (or possibly more than one) predetermined wavelength range while at the same time exhibiting low loss for radiation in another wavelength range.

Components having this functionality are commercially available, typically comprising multilayer planar reflection coatings that are inserted into the optical path and fixed in place. These components can be designed to filter substantially any wavelength range, with transition from pass to stop band less than 50 nm, with wavelength isolation of about 30–55 dB, and with added loss of about 0.5 dB. However, these components typically are relatively costly since their fabrication is labor and skill-intensive. Thus, despite the relatively good characteristics of the prior art components, it would be highly desirable to have available components of equivalent functionality that can be manufactured at low cost and that can be quickly and simply installed. This application discloses such a component, and systems that comprise the component.

U.S. Pat. No. 4,946,250, issued Aug. 7, 1990 to F. Gonthier et al., discloses an optical fiber wavelength filter that comprises two spaced apart tapers of given profile. Such filters clearly are difficult to manufacture and are very fragile.

J. Nishimura et al., Proceedings of IOOC-95, paper WA 2–5, p. 26, disclose a dispersive fiber fabricated from optical glasses whose chromatic refractive indices intersect at some wavelength. The fiber has no propagation mode at shorter wavelengths, and can be used as a high-pass filter.

Silica-based single mode optical fibers having an "up-doped" core (i.e., a core with an effective refractive index greater than that of vitreous $SiO_2$) that is contactingly surrounded by a "down-doped" inner cladding (i.e., having a refractive index lower than that of vitreous silica), which in turn is surrounded by a vitreous silica outer cladding are known, and are commercially available. They are typically referred to as "depressed cladding" fibers.

SUMMARY OF THE INVENTION

In a broad aspect the invention is embodied in an optical fiber communication system that comprises a low cost, easily installed optical filter selected to transmit therethrough substantially without loss (e.g., loss <1 dB) electromagnetic radiation (henceforth "radiation") of a first wavelength (e.g., about 1.3 µm), and to at least substantially attenuate (e.g., loss >20 dB) radiation of a second wavelength (e.g., about 1.551 µm).

More specifically, the optical fiber communication system comprises a first source of radiation of a first wavelength, utilization means (exemplarily a receiver) for said radiation, and a first optical fiber transmission path connecting the first source and the utilization means. It also comprises a second source of radiation of a second wavelength, utilization means for the radiation of the second wavelength, and a second optical fiber transmission path connecting the second source and the utilization means, with at least a first portion of the first optical fiber transmission path being included in the second optical fiber transmission path. The system still further comprises an optical filter for substantially excluding radiation of the second wavelength from a second portion of the first optical fiber transmissive path.

Significantly, the optical filter comprises a length L (typically ≦100 m) of optical fiber selected to transmit therethrough radiation of the first wavelength substantially without loss (typically loss <1 dB), and to at least substantially attenuate (typically loss >20 dB) radiation of the second wavelength. It will be understood that the length L of optical fiber is essentially uniform in the axial direction, without intentional axial variations in refractive index or other fiber characteristics.

Exemplarily the optical fiber is a depressed cladding fiber designed to be a single mode fiber at the first wavelength ($\lambda_1$), with the fundamental mode being leaky (i.e., not guided) at the second wavelength ($\lambda_2$), with $\lambda_1 < \lambda_2$. The fiber thus acts as a low pass filter.

By way of further example, the optical fiber can be designed to be a single mode or multimode fiber at both the first and the second wavelength, but to be doped with a dopant selected to cause significantly higher absorption for radiation of the second wavelength than for radiation of the first wavelength. Such a fiber thus can act as a high pass, low pass, band pass or notch filter, depending on the characteristics of the dopant or dopants. Exemplarily, the dopant species is OH or Er, with the former having a strong absorption band around 1.38 µm, and the latter having strong absorption around 1.53 µm. Another exemplary absorbing species is Yb, which has an absorption peak at about 0.98 µm. Boron, as well as other rare earth elements, may also have utility as absorbing species.

Those skilled in the art will appreciate that optical fiber filters can be produced by conventional means at relatively low cost, comparable to the cost of conventional transmission fiber, since any excess cost that may be involved in producing the fiber preform will typically be spread over scores of kilometers of fiber, which can yield hundreds (or even thousands) of fiber filters.

Those skilled in the art will also appreciate that fiber filters according to the invention can be readily designed to be easily installed. For instance, a length L of appropriately coated filter fiber can be connectorized with any appropriate fiber connector, the resulting product having the appearance of a so-called fiber "jumper", and being installable as readily as a conventional jumper. Fiber filters of course can also be installed by, e.g., conventional splicing. Furthermore, fiber filters according to the invention can readily be designed such that their presence has essentially no deleterious effects at the pass-wavelength when the fiber filter experiences an environment substantially like that commonly experienced by conventional fiber jumpers.

Fiber filters according to the invention can be advantageously used in a variety of optical fiber communication systems. Among such systems are systems that transmit multiple (relatively widely spaced) wavelengths of signal radiation over a single fiber path, systems that monitor the fiber path (e.g., using OTDR) while carrying traffic, and unidirectional or bidirectional diplex systems with or without monitoring of the fiber path.

Although prior art optical filters could typically be used to perform the filtering function, their use typically entails substantial costs and inconvenience. Availability of convenient and low cost fiber filters thus can result in systems of lower cost, as well as in systems that offer features not previously available because they could not have been provided in a cost-effective manner.

DETAILED DESCRIPTION OF SOME EXEMPLARY EMBODIMENTS

The description below will be in terms of silica-based fiber filters. However, the invention can be embodied in non-silica-based (e.g., fluoride-glass) fiber filters, as those skilled in the art will recognize.

Figure 1:
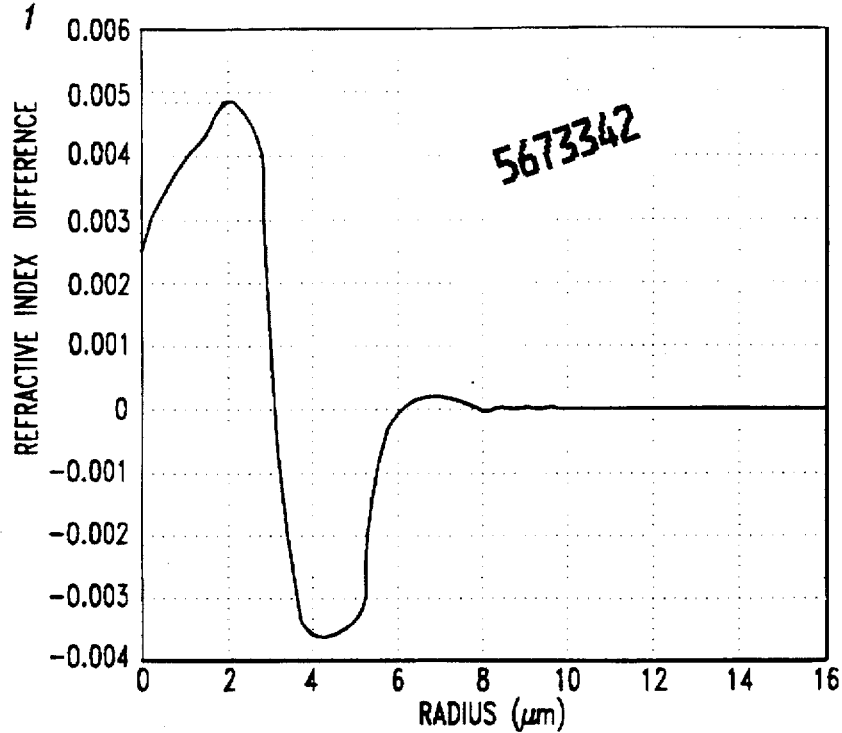
FIG. 1 shows the measured refractive index profile of an exemplary fiber filter.

FIG. 1 shows the measured refractive index profile of an exemplary optical fiber that can advantageously be used, for instance, as low pass filter to suppress 1.55 µm radiation without significantly attenuating 1.3 µm radiation.

The exemplary fiber is designed to be a single mode fiber (i.e., to support only the fundamental mode) at the 1.3 µm transmission window, and not to have a guided mode (i.e., the fundamental mode is a leaky mode) at the 1.55 µm transmission window. This is accomplished by designing the fiber such that the effective refractive index of the fundamental mode is equal to the refractive index of the outer cladding at some intermediate wavelength, being lower than that of the outer cladding at longer wavelengths (including 1.55 µm) and higher at shorter wavelengths (including 1.3 µm). The "effective refractive index" ($n_{eff}$) of a mode is $\beta\lambda/2\pi$, where $\beta$ is the propagation constant of the mode and $\lambda$ is the wavelength. Those skilled in the art will appreciate that the central dip in the measured refractive index profile of FIG. 1 is a result of the manufacturing process (MCVD) that was used to make the fiber preform and is not a requirement of fiber according to the invention.

Those skilled in the art are familiar with design procedures (typically involving computer-assisted modeling) that can readily be used to design an optical fiber that has the above described desired characteristic. Such fibers will typically have a core diameter in the range 4.0–9.0 µm, a depressed cladding outer diameter in the range 2–4 times the core diameter, $\Delta^+$ in the range 0.20–0.6%, and $\Delta^-$ in the range −0.1 to −0.6%, where $\Delta^+=(n_1-n_0)/n_1$, $\Delta^-=(n_2-n_0)/n_2$, with $n_1$, $n_2$ and $n_0$ being, respectively, the refractive index of the core, the refractive index of the depressed cladding, and the refractive index of the outer cladding (typically equal to that of vitreous silica). Furthermore, such fibers can be readily produced by known methods (e.g., MCVD, OVD, VAD) using known dopants (e.g., one or more of Ge, P and Al in the core, and one or more of F and B in the depressed cladding). In some preferred embodiments of the invention, at least a portion of the outer cladding has relatively high attenuation at the stop wavelength, such that the unguided radiation is absorbed in the outer cladding.

Figure 2:
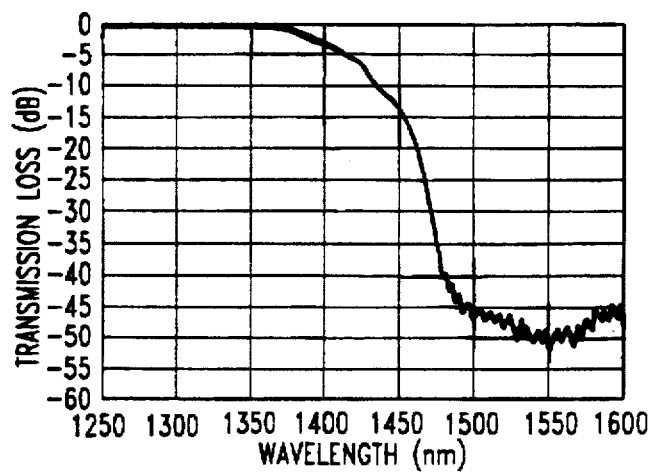
FIGS. 2 and 3 show the transmission spectrum of the fiber filter of FIG. 1, for an essentially straight fiber filter and for a tightly wound (loop radius 1.5 inches) fiber filter, respectively.
Figure 3:
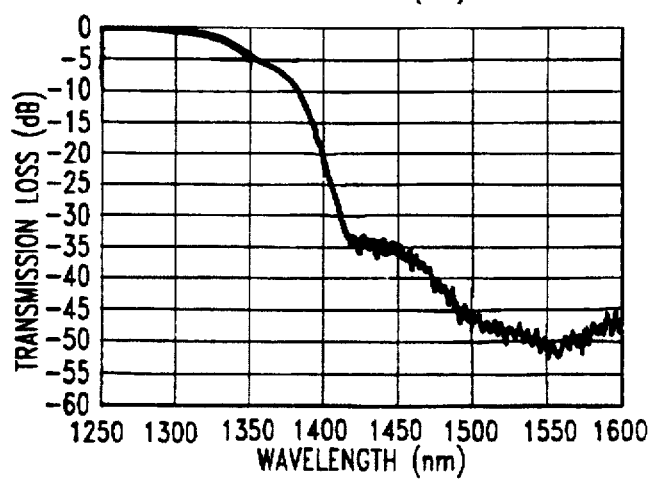

FIGS. 2 and 3 show spectral loss of 10 m of uncabled fiber substantially as shown in FIG. 1, for substantially straight fiber (loop radius<12 inches) and coiled fiber (loop radius 1.5 inches). As can be seen from the figures, filter characteristics show some dependence on loop radius. However, in both cases the fiber provided no observable attenuation at 1300 nm and up to about 1360 nm (conventionally the uppermost transmission wavelength of the 1300 nm transmission window), while severely (~55 dB) attenuating radiation at 1550 nm. The transition width between low and high loss is about 50 nm. The characteristics are substantially the same if the fiber is cabled in conventional manner, e.g., in the manner conventionally used for jumpers.

Fibers useful in the practice of the invention can also be produced by doping of the core (and possibly cladding adjacent to the core) with one or more dopants that absorb radiation at some desired wavelength. Exemplarily, OH has an absorption peak at about 1.38 µm, Er has a peak at about 1.53 µm, and Yb has a peak at 0.98 µm.

Such fibers can be made by known techniques, e.g., OVD, MCVD, VAD, solution doping or sol/gel. Currently preferred are solution doping techniques, since they frequently offer greater latitude for doping than other techniques. See, for instance, S. Poole et at., *J. Lightwave Technology*, LT-4 (7), p. 870 (1987).

Figure 4:
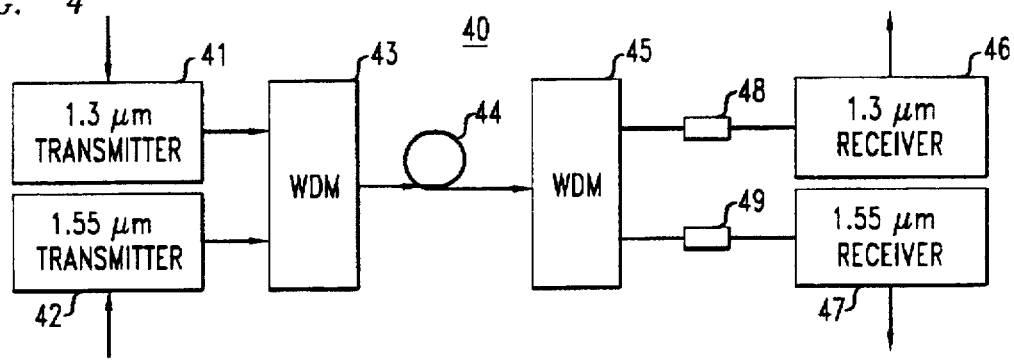
FIGS. 4 and 5 schematically show exemplary optical fiber communication systems according to the invention.

FIG. 4 schematically depicts an exemplary optical fiber communication system according to the invention with two signal wavelengths, wherein numerals 41 and 42 designate a 1.31 µm and a 1.55 µm transmitter (i.e., source of approximately 1.31 µm and 1.55 µm radiation), respectively, numerals 43 and 45 designate a conventional WDM combiner and de-multiplexer, respectively, numeral 44 designates a length of conventional transmission fiber (optionally including amplifiers and/or repeaters, as well as other conventional components), and numerals 46 and 47 refer to a 1.3 µm and a 1.55 µm receiver, respectively. Numerals 48 and 49 designate fiber filters according to the invention, with the former having low pass filter characteristics (i.e., pass 1.31 µm, block 1.55 µm), and the latter having high pass filter characteristics (pass 1.55 µm, block 1.3 µm).

Those skilled in the art will appreciate that the system of FIG. 4 can be modified in a variety of ways. For instance, it could be modified to allow for bidirectional transmission on the same fiber path.

Those skilled in the art will know that conventional WDM multiplexers typically are not able to completely separate two wavelengths. Thus, the signal arriving at fiber filter 48 will typically comprise a minor (but not insignificant; e.g., a few %) amount of 1.55 µm radiation, and the signal arriving at fiber filter 49 will typically comprise a minor amount of 1.3 µm radiation. Without filtering the system would have relatively poor noise characteristics. Provision of the fiber filters can considerably improve the noise characteristics at small cost and low added complexity.

Figure 5:
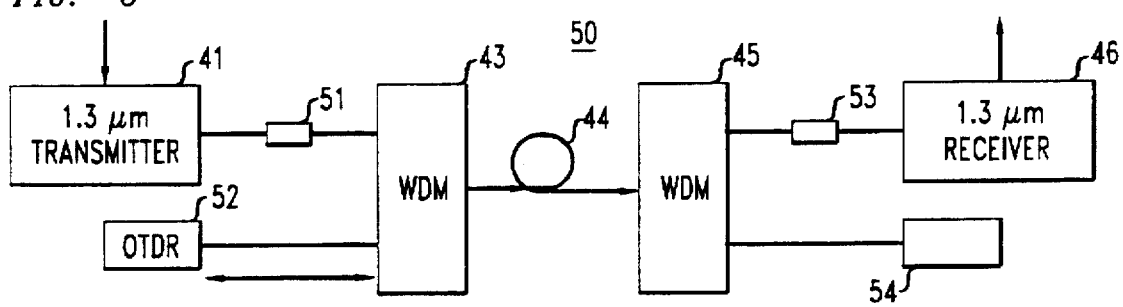

FIG. 5 shows a further exemplary embodiment of the invention, namely, a 1.3 µm optical fiber communication system 50 with monitoring means (optical time domain reflectometry or OTDR) operating at a different wavelength, e.g., at about 1.55 µm or 1.6 µm). OTDR transceiver 52 emits pulses of monitoring radiation that are coupled into transmission fiber 44 by conventional means e.g., WDM 43. Between pulses the OTDR transceiver acts as receiver of reflected monitoring radiation. Fiber filters 51 and 53 are provided to suppress monitoring radiation but transmit the 1.3 µm signal radiation. Numeral 54 refers to an optional absorber of monitoring radiation.

Those skilled in the art will recognize that non-invasive monitoring is not limited to simple systems as schematically shown in FIGS. 4 and 5, but can at least in principle be incorporated into substantially any fiber communication system, including optically amplified systems (in the latter case some by-pass for reflected monitoring radiation around isolators will typically be provided). Fiber filters according to the invention will advantageously be provided in substantially all optical fiber communication systems that carry radiation in more than one wavelength band. The fiber filters are, however, not intended to provide filtering of channels in a WDM system with closely spaced signal channels.

Figure 6:
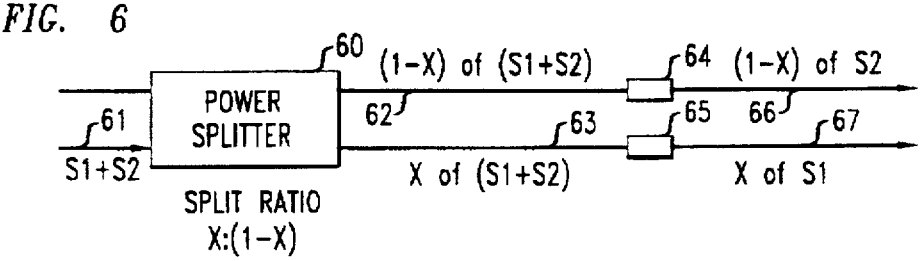
FIGS. 6 and 7 schematically illustrate exemplary applications of fiber filters.
Figure 7:
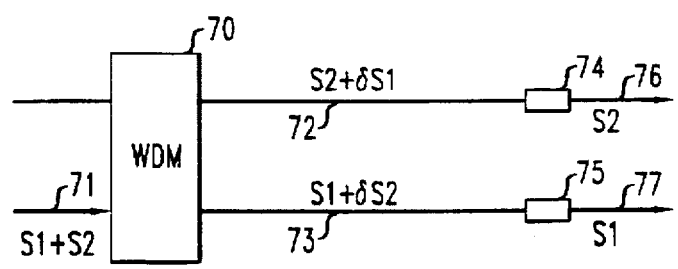

Availability of low cost fiber filters makes possible the use of components that, by themselves, might not have system-compatible performance characteristics. This is schematically illustrated in FIG. 6, with regard to an optical power splitter 60 that receives on input fiber 61 two signals (S1 and S2) that are more than about 50 nm apart in wavelength. The power splitter has power split ratio x:(1−x). Thus, the power on output fibers 62 and 63 is, respectively, (1−x) of S1+S2, and x of S1+S2. Fiber filters 64 and 65 have passbands that include S2 and S1, respectively, and stopbands that include S1 and S2, respectively. Thus, the radiation at fibers 66 and 67 is, respectively, (1−x) of S2 and x of S1, and the wavelength separation of the combined signal is easily and inexpensively accomplished. A further exemplary combination is schematically shown in FIG. 7, wherein WDM 70 receives input S1+S2 (having characteristics substantially as described) on input fiber 71. Known WDMs do not perform their wavelength-separation function perfectly, and lower cost WDMs will generally perform that function less well than higher cost WDMs. Thus, on output fibers 72 and 73 appears, respectively, S2+δS1 and S1+δS2, where δ signifies a relatively small amount of the following signal. Fiber filters 74 and 75 have a passband at S2 and S1, respectively, and a stopband at S1 and S2, respectively. Thus the signal at fibers 76 and 77 is, respectively, substantially pure S2 and S1, respectively, and substantial spectral purity is achieved at relatively low cost.

The invention claimed is:

1. An optical fiber communication system comprising:

a) a first source of electromagnetic radiation of a first wavelength $\lambda_1$, first utilization means for electromagnetic radiation of the first wavelength, and a first optical fiber transmission path connecting said first source and said first utilization means;

b) a second source of electromagnetic radiation of a second wavelength $\lambda_2$, second utilization means for the electromagnetic radiation of the second wavelength, and a second optical fiber transmission path connecting said second source and said second utilization means, with at least a first portion of said first optical fiber transmission path being included in said second optical fiber transmission path; and c) an optical filter for substantially excluding electromagnetic radiation of the second wavelength from a second portion of the first optical fiber transmission path, said filter being disposed in said first optical fiber transmission path;

Characterized In That d) the optical filter comprises a length L of axially essentially uniform optical fiber selected to transmit electromagnetic radiation of the first wavelength substantially without loss, and to at least substantially attenuate electromagnetic radiation of the second wavelength.

2. System according to claim 1, wherein said optical fiber is a silica-based optical fiber that is a single mode optical fiber at $\lambda_1$, and does not support a guided radiation mode at $\lambda_2$, where $\lambda_1 < \lambda_2$.

3. System according to claim 2, wherein $\lambda_1$ and $\lambda_2$ are approximately 1.3 μm and 1.55 μm, respectively, wherein said optical fiber has a core of diameter in the range 4.0–9.0 μm, having a depressed cladding of outer diameter in the range 2–4 times the core diameter, and having refractive index differences $\Delta^+$ and $\Delta_-$ in the range 0.20–0.60% and −0.10 to −0.60%, respectively, where $\Delta^{3o} = (n_1-n_0)/n_1$, $\Delta^- = (n_2-n_0)/n_2$, with $n_1$, $n_2$ and $n_0$ being, respectively, the refractive index of the core, the refractive index of the depressed cladding, and the refractive index of an outer cladding.

4. System according to claim 2, wherein the optical fiber comprises a core, a depressed cladding contactingly surrounding the core, and an outer cladding contactingly surrounding the depressed cladding, wherein at least a portion of the outer cladding is selected to absorb radiation of the second wavelength.

5. System according to claim 1, wherein the optical fiber comprises a core and a cladding contactingly surrounding the core, and wherein at least the core comprises a dopant species that does substantially not absorb radiation of the first wavelength and absorbs radiation of the second wavelength, such that the length L of optical fiber has a loss<1 dB at $\lambda_1$, and a loss>20 dB at $\lambda_2$.

6. System according to claim 5, wherein $\lambda_1 > \lambda_2$.

7. System according to claim 1, comprising system monitoring means, wherein the radiation of the first wavelength is signal radiation and the radiation of the second wavelength is system monitoring radiation.

8. System according to claim 7, wherein the system monitoring means are optical time domain reflectometry means.

9. System according to claim 1, wherein both the radiation of the first wavelength and the radiation of the second wavelength are signal radiation.

10. System according to claim 9, wherein the system is selected to support unidirectional transmission of signal radiation over the first portion of the first optical fiber transmission path.

11. System according to claim 9, wherein the system comprises bidirectional transmission of signal radiation over the first portion of the first optical fiber transmission path.

* * * * *

UNITED STATES PATENT AND TRADEMARK OFFICE
CERTIFICATE OF CORRECTION

PATENT NO. : 5,673,342

DATED : September 30, 1997

INVENTOR(S) : Katherine Theresa Nelson, William Alfred Reed, Kenneth Lee Walker, and Ian Arthur White It is certified that error appears in the above-identified patent and that said Letters Patent is hereby corrected as shown below:

Column 6, line 18, "$\Delta^+$ and $\Delta_-$ should read --$\Delta^+$ and $\Delta^-$--.

Signed and Sealed this

Twenty-fourth Day of February, 1998

Attest:

BRUCE LEHMAN

*Attesting Officer*   *Commissioner of Patents and Trademarks*